May 16, 1944.  K. FISCHER  2,348,733
METHOD AND MEANS FOR INDICATING THE SPECIFIC
GRAVITY OF FLOWING FLUIDS
Original Filed Dec. 2, 1940   3 Sheets-Sheet 1
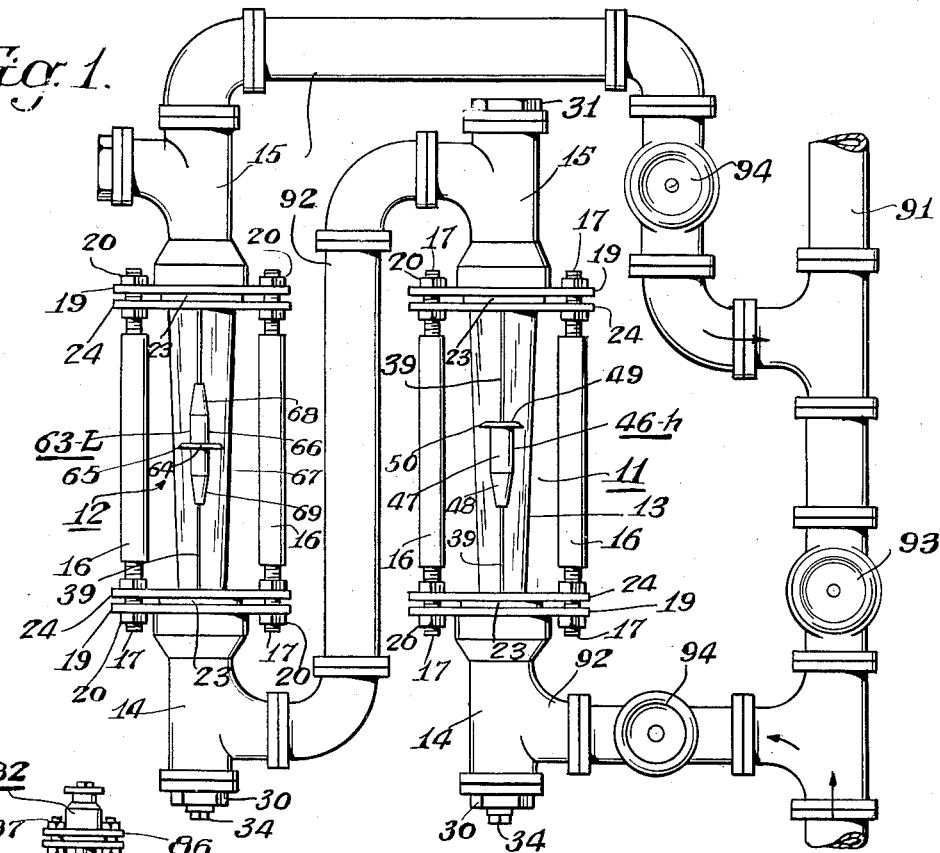
Fig. 1.
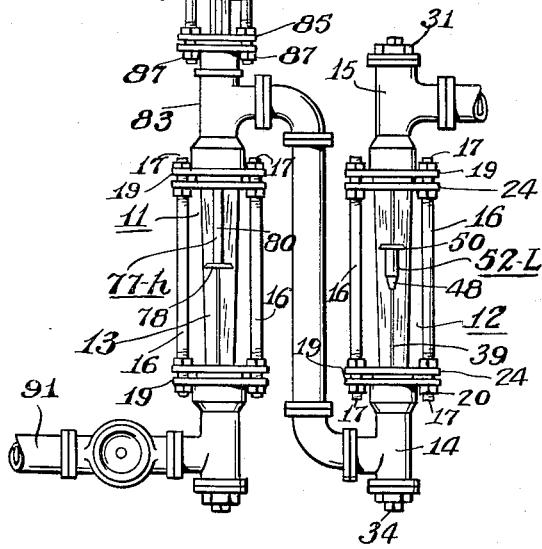
Fig. 2.
Fig. 7.
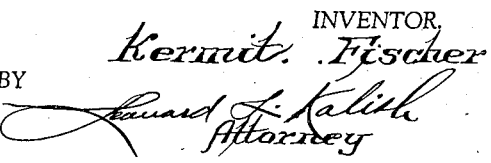
INVENTOR
Kermit Fischer
BY Leonard L. Kalish
Attorney May 16, 1944.   K. FISCHER   2,348,733
METHOD AND MEANS FOR INDICATING THE SPECIFIC
GRAVITY OF FLOWING FLUIDS
Original Filed Dec. 2, 1940    3 Sheets-Sheet 2
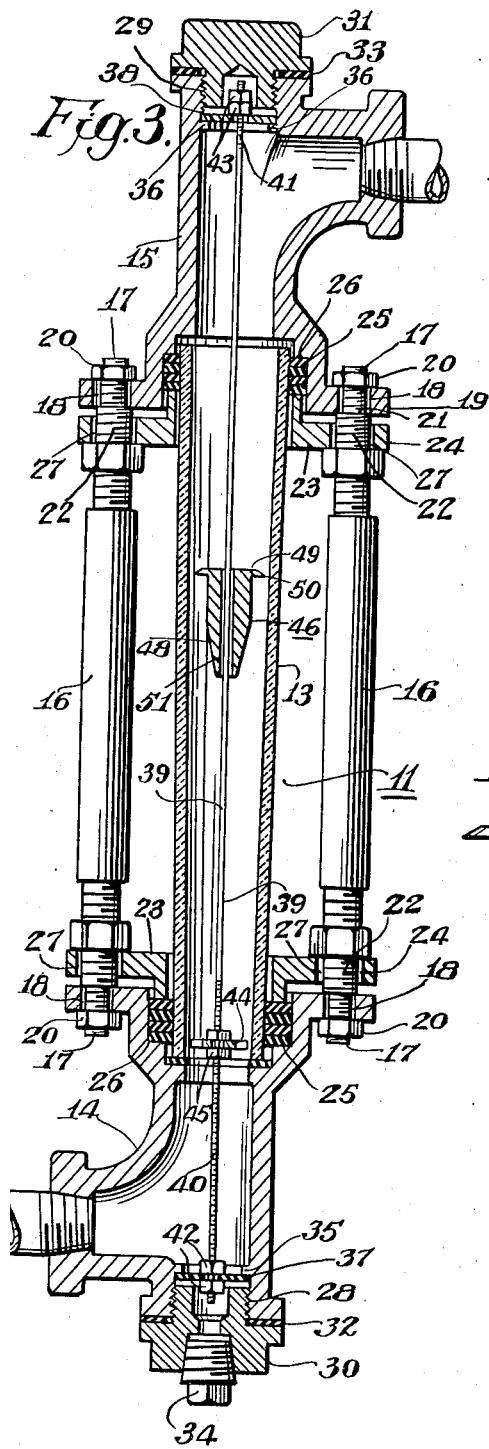
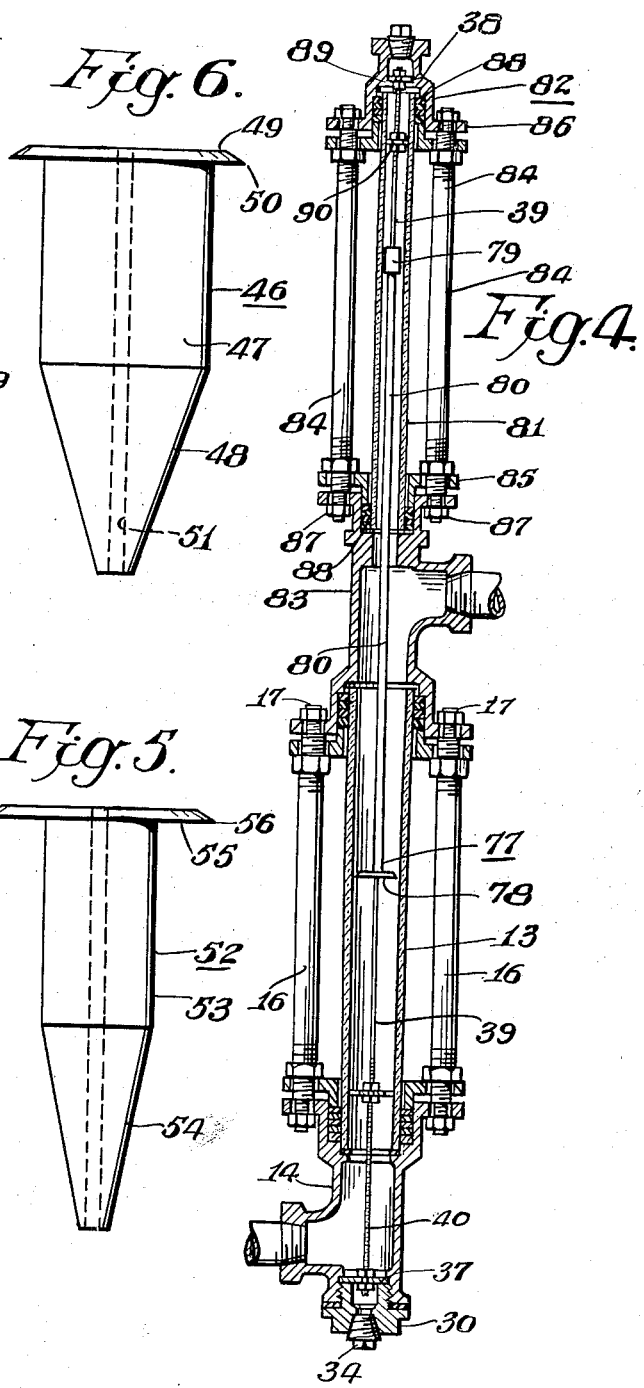
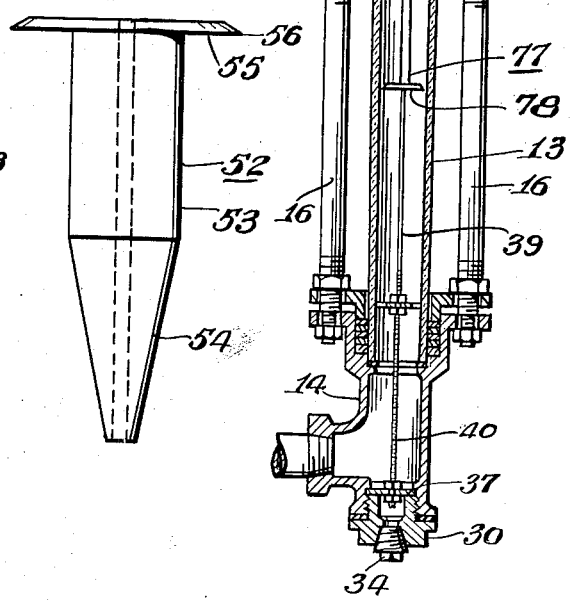
INVENTOR.
Kermit Fischer
BY Leonard L. Kalish
Attorney

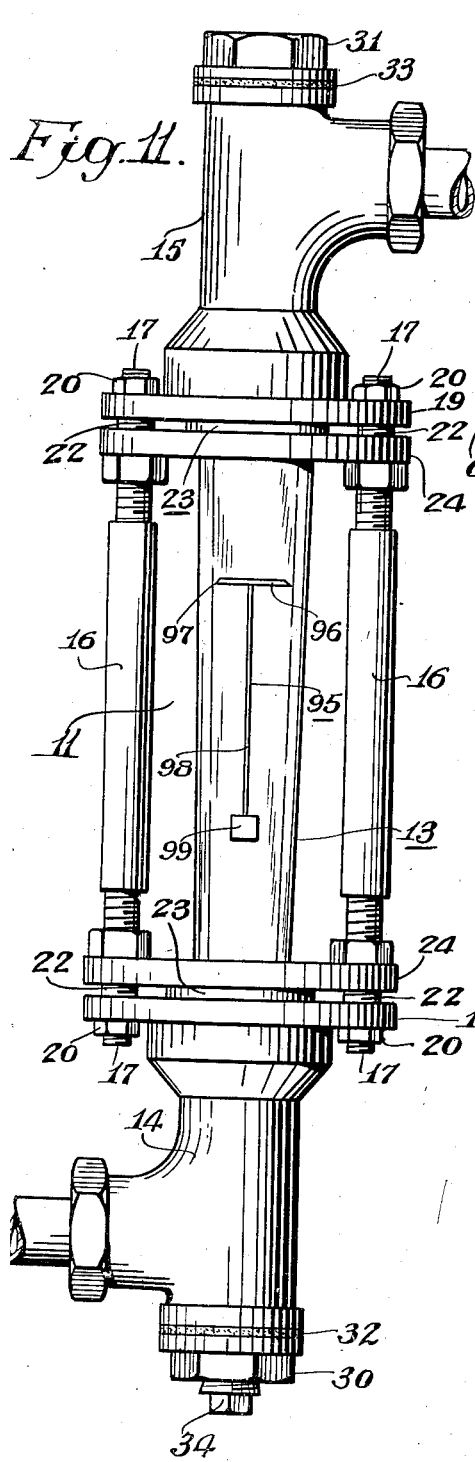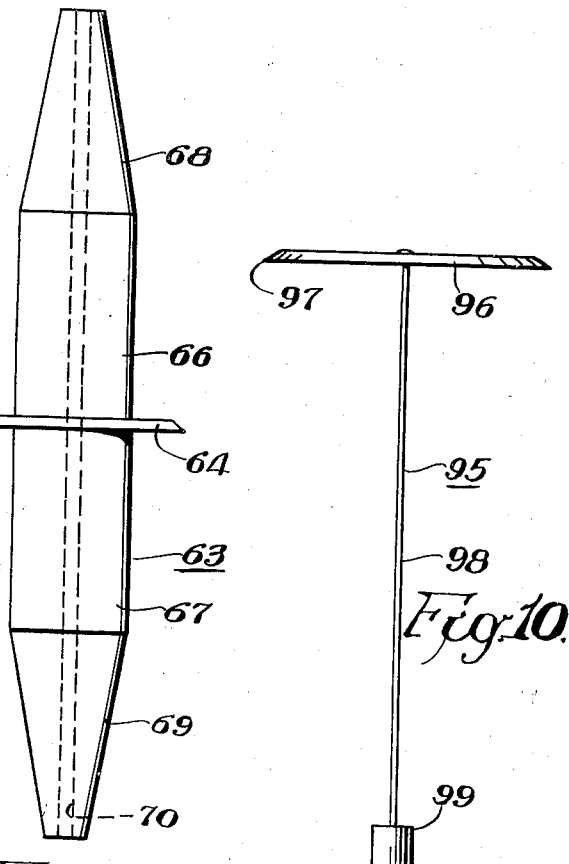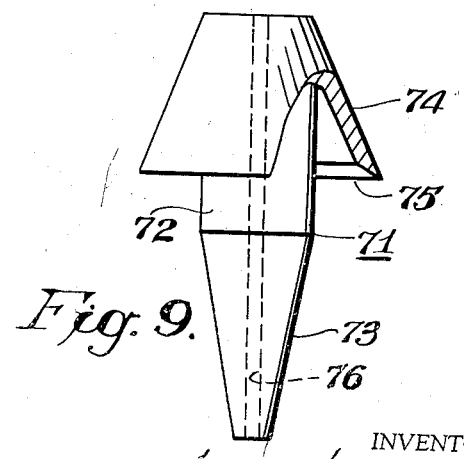

Patented May 16, 1944

2,348,733

UNITED STATES PATENT OFFICE 2,348,733

METHOD AND MEANS FOR INDICATING THE SPECIFIC GRAVITY OF FLOWING FLUIDS

Kermit Fischer, Bridge Valley, Pa., assignor to Fischer & Porter Company, Hatboro, Pa., a corporation of Pennsylvania Original application December 2, 1940, Serial No. 368,246. Divided and this application January 15, 1943, Serial No. 472,452

5 Claims. (Cl. 265—44)

The present invention relates to a certain new and useful method of and apparatus for determining the specific gravity of fluids in motion, for example, through a pipe line.

The present application is a division of my co-pending application Serial No. 368,246, filed December 2, 1940, which issued into Patent No. 2,348,732.

An object of the present invention is to provide a simple, dependable and reasonably accurate method for determining, and maintaining a constant check on, the specific gravity of a fluid in motion, as for instance, fluids in transit in industrial chemical processes, without having to remove any of the fluid from the line. A further object of the present invention is to provide dependable and relatively inexpensive apparatus for determining and maintaining a constant check upon, the specific gravity of a fluid in motion, for example, through a pipe line. With the above and other objects in view, which will appear more fully from the following detailed description, appended claims and accompanying drawings, one phase of the present invention consists of a process of measuring the specific gravity of a fluid in motion in a pipe line, which comprises passing the fluid through a rate-of-flow indicating device relatively insensitive to changes in specific gravity and viscosity of the fluid, and through another indicating device sensitive to rate-of-flow and also to the specific gravity of the fluid but relatively insensitive to changes in the viscosity of the fluid, the above devices being connected in series.

Another phase of the present invention consists of a device or apparatus through which fluid may be passed, and which is adapted to be inserted in a pipe line through which the fluid normally passes (or into a by-pass associated with such pipe line), such device or apparatus including a series of two flow-responsive indicators, in series, one being relatively insensitive to variations in specific gravity and viscosity of the fluid, and the other being relatively insensitive to viscosity changes but sensitive to specific gravity changes, whereby the specific gravity of the fluid may be determined from the readings of the two indicators.

The present invention further consists of other novel phases, features and constructions all of which will appear more fully from the following description, appended claims and accompanying drawings.

Referring to the accompanying drawings in which like reference characters indicate like parts throughout:

Figure 1 represents a more or less schematic representation of one embodiment of the present invention.

Figure 2 represents a more or less schematic representation of another embodiment of the present invention.

Figure 3 represents a vertical cross-sectional view of a rotameter forming part of my present invention.

Figure 4 represents a vertical cross-sectional view of another rotameter forming part of my present invention.

Figure 5 represents a front elevational view of a metering float which may be used in the rotameter shown in Figure 3.

Figure 6 represents a front elevational view of another form of float which may be used in place of the float shown in Figure 5.

Figure 7 represents a front elevational view of still another form of float which may be used with the rotameter as shown in Figure 3.

Figure 8 represents a front elevational view of another form of float which may be used in the rotameter shown in Figure 3.

Figure 9 represents a front elevational view of another form of float which may be used in the rotameter shown in Figure 3.

Figure 10 represents a front elevational view of another form of float which may be used in a modified form of the rotameter shown in Figure 3 and which does not require a guide wire.

Figure 11 represents a front elevational view of a rotameter resembling that of Figure 3, but without the guide wire and employing the metering float shown in Figure 10.

The apparatus, according to one embodiment of the present invention, includes a rotameter 11 which is affected by changes in the rate-of-flow of a fluid (and which is relatively unaffected by variations in viscosity or specific gravity of the fluid) and another rotameter 12 which is affected by changes in the rate-of-flow and also by changes in the specific gravity of the fluid (but which is more or less unaffected by changes in viscosity).

Rotameters 11 and 12 are connected in series as shown in Figure 1 (the order in which they are connected being immaterial) and, except for the difference in metering float as will be fully brought out hereinbelow may be identical in construction and may correspond to the rotameter shown in vertical cross-section in Figure 3.

The rotameter of Figure 3 includes a tapered glass tube 13 which is supported between terminal fittings 14 and 15 to which the pipe line is connected. The fittings 14 and 15 are held together in rigid and spaced relation to each other by a plurality of spacer posts or standards 16 whose reduced and threaded terminal portions 17 pass through corresponding aligned holes 18 in the similar flanges 19 of the fittings 14 and 15. Flanges 19 are held firmly in position between the nuts 20 on the reduced-diameter terminal portions 17 and the shoulders 21 intermediate the reduced-diameter terminal portions 17 and the somewhat larger threaded portions 22 of the posts 16. Similar lower and upper stuffing glands 23 having flanges 24, are provided for compressing suitable packing rings or material 25 within the stuffing box portions or recesses 26 of the fittings 14 and 15, in sealing relation to the ends of the tapered glass tube 13 and said fittings 14 and 15. The flanges 24 are provided with aligned apertures 27 through which the large threaded portions 22 of the posts 16 extend. The nuts 20 serve adjustably to press the stuffing glands 23 into place.

The fittings 14 and 15 are provided with threaded axial openings 28 and 29 which are normally closed by threaded plugs 30 and 31 and intervening sealing gaskets 32 and 33. The lower plug 30 may also have a further screw plug 34 provided therein.

Within the aligned openings 28 and 29, similar inwardly extending flanges 35 and 36 are formed, which provide annular shoulders or abutments for supporting wire anchorage plates or washers 37 and 38. The anchorage plates or washers 37 and 38 are centrally apertured to accommodate the thin guide wire 39 which is threaded at its lower and upper ends as at 40 and 41 to receive the holding nuts 42 and 43. The wire 39 is placed under sufficient tension by the nuts 42 and 43 as to maintain it under slight tension at all times notwithstanding the temperature changes encountered in operation. That is, sufficient tension is placed upon the wire 39, so that upon expansion due to rise in temperature, it will still remain taut.

A multi-spoked centering member or spider 44 is also supported on the wire 39 adjacent the lower end of the tapered tube 39 by nuts 45. The centering member or spider 44 serves accurately to center the wire 39 along the axis of the tube 13 and also serves as a bottom stop for the metering float which is mounted upon the wire 39 and which will be described hereinbelow.

When the rotameter is connected within a pipe line or the like, the fluid is adapted to enter through the lower fitting 14 and to pass upwardly through the tapered tube 13, finally to leave through the upper fittings 15.

Slidably mounted upon the guide wire 39 within the tapered tube 13 is a metering float which has a greater specific gravity than the fluid being metered and which, therefore, rests upon the spider 44 when the fluid is not in motion. When the fluid starts moving through the pipe line and upwardly through the tube 13, the metering float is lifted thereby to a position intermediate the ends of the tube 13; the greater the rate-of-flow of the fluid, the greater the height to which the metering float is lifted.

I have found that by providing the rotameter 11 with a metering float, the position of which is determined solely by the rate-of-flow of the fluid (the position of the float being generally unaffected by variations in viscosity or specific gravity of the fluid) and by providing the rotameter 12 with a metering float, the position of which is determined by the rate-of-flow of the fluid and also by the specific gravity of the fluid (the position of the float being generally unaffected by variations in the viscosity of the fluid), I can from the relative positions of the metering floats of the rotameters 11 and 12 connected in series in a pipe line determine the specific gravity and variations therein of the fluid in motion through the pipe line.

The metering floats for the rotameters 11 and 12 may have generally the same physical construction and appearance which renders them relatively insensitive to variations in viscosity of the fluid.

Thus, for example, the metering float 46 shown in Fig. 6 comprises an elongated cylindrical generally vertically extending body portion 47, a tapered tail portion 48 and a head portion 49 formed at the upper end of the body portion. The head portion 49 of the float 46 is a thin annular generally transversely extending portion whose transverse dimension approximates the smallest diameter of the tapered tube 13 and is substantially greater than the transverse dimension of the body portion 47. The thickness or axial dimension of the head portion 49 is of the order of $\frac{1}{25}$ of its maximum transverse dimension. The periphery of the head portion 49 is beveled to a knife edge as at 50.

It has been found that a float having such a thin head portion and having a body portion which is substantially recessed from the walls of the tapered tube is generally unaffected by viscosity variations of the fluid.

That is, the position of a metering float of the above-described shape within the tapered metering tube is generally independent of viscosity variations, within the limits of error permitted during the measurement of rate-of-flow and of specific gravity. The presence of the beveled knife edge tends further to minimize the effect of viscosity variations upon the position of the metering float.

The metering float 46 is provided with a central axial aperture 51 having a diameter somewhat larger than the diameter of the guide wire 39 which passes therethrough; the float being capable of free up-and-down movement within the tube 13 and being guided therein by the guide wire 39 which holds the metering float in spaced relation to the walls of said tube 13.

In place of the float 46, I may employ the float 52 of Figure 6 which has an elongated cylindrical vertically extending body portion 53, a tapered tail portion 54 and a thin transversely extending annular head portion 55 having a beveled knife edge periphery 56, and which has a central axially-extending aperture therethrough. The float 52 of Figure 6 differs from the float 46 of Figure 5 in that its body portion 53 has been further reduced in diameter or transverse dimensions to a point at which it is half or less than half the maximum diameter of the head portion 55. This further reduction in diameter of the body portion tends further to minimize the effect of viscosity variations.

Another form of float which may be used with the rotameter shown in Figure 3 is the float 58 shown in Figure 7. The float 58 of Figure 7 has a cylindrical body portion 59, a tapered tail portion 60 and a thin annular transversely-extending head portion 61 and has a central axially-extending aperture 62 therethrough. The float 58 of Figure 7 generally resembles the float 46 of Figure 5, except that its head portion 61 is not beveled or knife-edged at its outer periphery.

Still another form of float which may be used with the rotameter of Figure 3 is the float 63 of Figure 8 which has a thin annular transversely-extending head portion 64 having a beveled knife-edge formed along its outer periphery as at 65 and which has upper and lower elongated cylindrical body portions 66 and 67 and upper and lower tapered tail portions 68 and 69; a central axially-extending aperture 70 being formed therein.

A further modified form of float which may be used with the rotameter of Figure 3 is the float 71 of Figure 9 which is covered by my co-pending application, Serial No. 409,048, filed August 30, 1941. The float 71 has an elongated cylindrical body portion 72, a tapered lowermost tail portion 73, and a thin annular conical downwardly-opening head portion 74, which is beveled along its outer periphery to a knife edge as at 75. A central axially-extending aperture 76 is formed in the float 71 to accommodate the guide wire 39.

The downwardly-opening conical head portion 74 of the float 71 has been found to be particularly effective in reducing viscosity effect upon the metering float.

Another form of rotameter which may be used is that shown in vertical cross-section in Figure 4, in which a float designated generally by the reference character 77 is formed with a thin transversely-extending head portion 78 and a body portion 79 which is spaced substantially below or above the head portion 78 by means of a thin connecting tubular spacer portion 80; the head portion 78 along being disposed within the tapered tube 13, while the body portion 79 is disposed within the auxiliary tube 81 outside the path of liquid flow, said tube 81 being of glass or metal or other suitable material and being held between the modified upper fitting 82 and the auxiliary fitting 83.

While in Figure 4 the auxiliary tube 81 and the body portion 79 are shown as being above the metering tube 13, this can be reversed by merely turning the entire unit upside down (from the position shown in Figure 4), and mounting the smaller end of the tapered tube 20 in the modified fitting 82 while the larger end of the tube 13 will be in the fitting 14. In this modified form of construction, the fittings 82 and 83 are held together through posts 84 and flanges 85 and 86 and nuts 87 in a manner similar to the retention of the fittings 14 and 15 shown in Figure 3. The tube 81 is similarly held in sealed relation by stuffing glands 88. In place of the inwardly-extending flange 36, however, a similar flange 89 is provided in the upper fitting 82 which holds the anchorage plate 38 in the same manner. An upper spider and stop member 90 may also be provided on the guide wire 39.

The floats hereinabove described (including floats 46, 52, 58, 63 and 71 for use with the rotameter of Figure 3 and including, also, the float 77 for use with the rotameter of Figure 4) may be constructed so that they have an appreciably greater specific gravity than that of the fluid to be metered. This may be done by constructing the metering float from a relatively dense material or by weighting the float with a small amount of very appreciably denser material as for example, mercury or lead (preferably placed in the interior of the body portion).

When the floats 46, 52, 58, 63, 71 and 77 are thus constructed with an appreciably greater specific gravity, than that of the fluid, they may be considered as being numbered 46—$h$, 52—$h$, 58—$h$, 63—$h$, 71—$h$ and 77—$h$ (the $h$ standing for heavy). I have found that by employing floats of the character of 46—$h$, 52—$h$, 58—$h$, 63—$h$, 71—$h$ and 77—$h$, the position of the metering float within the tapered tube 13 is generally independent of, and unaffected by, changes in specific gravity, as well as viscosity of the fluid.

Thus, the reading of the rotameter 11 (which may be either the rotameter shown in Figure 3 or the rotameter shown in Figure 4) indicates directly the rate-of-flow of the fluid.

On the other hand, when the floats designated by the reference characters 46, 52, 58, 63, 71 and 77 are constructed to have a specific gravity only slightly greater than the specific gravity of the fluid to be metered, the position of the metering float within the tube 13 is affected by changes in specific gravity as well as changes in rate-of-flow of the fluid but still remains unaffected by changes in viscosity. Floats thus constructed to have a specific gravity only slightly greater than the specific gravity of the fluid may be specified as 46—$l$, 52—$l$, 58—$l$, 63—$l$, 71—$l$ and 77—$l$ (the $l$ standing for light).

Thus, the reading of the rotameter 12 (which may be either the rotameter shown in Figure 3 or the rotameter shown in Figure 4) indicates the cumulative effect of both rate-of-flow and of specific gravity. It is apparent that, from the reading of the rotameter 11 (which indicates rate-of-flow) and the reading of the rotameter 12 (which indicates rate-of-flow plus specific gravity) the specific gravity of the fluid moving in the pipe line, as well as variations in the specific gravity of the fluid can readily be determined.

Instead of employing the apertured floats 46, 52, 58, 63, 71 and 77, I may employ the float 95 of Figure 10. The float 95 may consist of the thin transversely-extending head portion 96 having a beveled knife-edge outer periphery 97, a relatively thin, downwardly-depending connecting portion 98 and a lowermost weighted body portion 99. In this construction, the connecting portion 98 is made relatively long and the body portion 99 is made much denser than the remainder of the float 95. As a result of this construction, the float 95 has its center of gravity at a point considerably below the head portion and this produces a stabilizing effect (that is, the weighted body portion 99 acts as the bob of a long pendulum which has a correspondingly long moment or rate-of-oscillation). Thus, the float 95 will tend to remain relatively stable and to be relatively free of gyration, wobbling or other undesired lateral movements. When the float 95 is employed, it is unnecessary to provide a guide wire in the rotameter so that float 95 can be employed with the simplified rotameter construction shown in Figure 11. The rotameter of Figure 11 generally resembles that of Figure 3, except that the guide wire and its associated fastening and centering elements are omitted.

By constructing the float 95 with a specific gravity substantially greater than the specific gravity of the fluid, the rotameter of Figure 11 will measure rate-of-flow directly. On the other hand, if the float 95 is constructed with a specific gravity only slightly higher than the specific gravity of the fluid, the rotameter of Figure 11 will measure the cumulative effect of specific gravity plus flow-rate.

In Figure 1, I have shown, schematically, one form of hook-up or piping arrangement for thus determining the specific gravity of a fluid moving in a pipe line. In Figure 1, the main pipe line is indicated generally by the reference character 91; the rotameters 11 and 12 being connected in a by-pass line indicated by the reference character 92. A valve 93 is provided in the main line intermediate the ends of the by-pass line and valves 94 are provided at either end of the by-pass line 92. By closing the valve 93 and opening the valves 94 the fluid moving upwardly within the pipe line 91 can be by-passed through the line 92 and caused to flow through the rotameters 11 and 12 which are connected in series within said by-passed line 92; it being immaterial whether the rotameter 11 is placed before or after the rotameter 12. By closing the valves 94 and opening the valve 93, the by-pass line 92 can be cut off to permit cleaning, repair or replacement of the rotameters.

The flow-rate indicating rotameter 11 shown in Figure 1 is the rotameter of Figure 3 employing the float 46—h (the float 46 of Figure 5 having a specific gravity substantially greater than the specific gravity of the fluid). The flow-rate plus specific gravity indicating rotameter 12 shown in Figure 1 also employs the rotameter of Figure 3 but with the float 63—l (the float 63—l being the float 63 shown in Figure 8 constructed with a specific gravity only slightly higher than the specific gravity of the fluid).

In Figure 2 there is shown another piping arrangement in which the rotameters are connected directly in the main pipe-line 91.

The flow-rate indicating rotameter 11 of Figure 2 employs the rotameter construction of Figure 4 with the float 77—h (the float 77 constructed with a specific gravity appreciably greater than the specific gravity of the fluid). The specific-gravity plus flow-rate indicating rotameter 12 of Figure 2 employs the rotameter construction of Figure 3 with the float 52—l (the float 52 of Figure 6 constructed with a specific gravity only slightly greater than the fluid).

From the foregoing description, it is obvious that many other combinations of the rotameters of Figures 3, 4 and 11 as well as the floats of Figures 5 to 10 could be employed; the only requirement being that the float of one of the rotameters have a specific gravity appreciably greater than the specific gravity of the fluid (so that the rotameter measures rate-of-flow directly) while the float of the other rotameter have a specific gravity only slightly greater than the specific gravity of the fluid (so that the rotameter measures the cumulative effect of specific gravity plus flow-rate).

In carrying out my process for determining the specific gravity of a moving fluid, I pass the fluid through the rotameters 11 and 12, connected in series (the rotameters 11 and 12 being either in the main line or in a by-pass line as above described). From the differences in reading of the two rotameters, I can readily calculate the specific gravity of the fluid and the fluctuations in specific gravity of the fluid. Where a simplified determination of the specific gravity is desired, the rate-of-flow of the fluid can be maintained constant by suitable regulating valves which can either be automatic in operation or which can be manually controlled (the operator regulating the valve to maintain the float of the flow-rate indicating rotameter 11 constant).

It is to be understood that the piping arrangements shown in Figures 1 and 2 are for purposes of illustration only and that other arrangements (as well as other combinations of metering floats) are possible and are contemplated.

In carrying out the present invention, the apparatus may be of smaller capacity than the main flow through the pipe line to which it is connected so that only a fractional part of the main flow can ever be diverted to and through the apparatus. This fractional part of the main stream of fluid may be permitted to flow through the specific gravity indicating apparatus of the present invention continuously with a valve preferably at the inlet leading to the apparatus through which the flow may be throttled or may be shut off entirely. The novel method and apparatus of my present invention have the marked advantage of not interfering with the main flow of fluid as distinguished from old-type conventional specific gravity measurements which require the removal and separate treatment of a portion of the fluid.

Another marked advantage of the present invention is that the determination of the specific gravity can (after simple calibration) be made continuously and instantaneously and with no delay such as is encountered with conventional specific gravity determining apparatus.

The rotameters described hereinabove may be considered as variable-orifice constant-pressure-drop flow meters; the orifice being the annular clearance between the metering float and the metering tube (which clearance increases as the float rises within the tube), the pressure-drop across the orifice being equal (when the float is stationary within the tube) to the negative buoyancy of the float with respect to the fluid being metered. Where the float has an appreciably greater specific gravity than the fluid or, stated in other words, has a substantial negative buoyancy, the pressure-drop across the orifice is so great that variations in specific gravity of the fluid such as may be encountered in a fluid moving within a pipe line have a negligible effect upon the position of the float. Thus, the reading of the rotameter 11 with its relatively heavy float is generally independent of specific gravity variations and will indicate rate-of-flow directly within the limits of accuracy of the rotameter.

On the other hand, where the float has a specific gravity only slightly greater than the specific gravity of the fluid or, stated in other words, where the float has only a slight negative buoyancy with respect to the fluid, the pressure-drop across the orifice is so small that variations in the specific gravity of the fluid (which, of course, change the negative buoyancy of the float and the pressure-drop across the float) will have a marked effect upon the height of the float within its metering tube. Thus, the reading of the rotameter 12 with its float of only slight negative buoyancy is an indication of the cumulative effect of both rate-of-flow and specific gravity of the fluid.

When the rotameters 11 and 12 are connected in series, the differences in the positions of their respective floats provide a direct indication of variations in the specific gravity of the fluid at the same and different flow-rates.

As used in the foregoing specification and in the appended claims, the expression "constant-pressure-drop" refers to the characteristic of the flow meter forming part of my present invention when it is used upon a fluid of constant specific gravity and when the metering float is in a state of equilibrium (when the float is stationary at some point intermediate the ends of the metering tube). Where the specific gravity of the fluid varies, the negative buoyancy of the float and the pressure-drop across the float also necessarily vary. Similarly, when the float is moving upward or downward within the metering tube, the pressure-drop across the metering float is larger or smaller, respectively, than the pressure-drop at equilibrium; the unbalance in pressure-drop being finally compensated by the variation in orifice size at different vertical levels within the metering tube.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. A method for determining the specific gravity of a moving fluid which comprises passing said fluid through a rotameter relatively insensitive to changes in specific gravity, and passing said fluid through a rotameter sensitive to and affected by changes in rate-of-flow and changes in specific gravity, said rotameters being connected in series.

2. A device for determining the specific gravity of a moving fluid which comprises a rotameter relatively insensitive to changes in specific gravity but responsive to changes in rate-of-flow and a rotameter sensitive to and affected by changes in rate-of-flow and changes in specific gravity, said rotameters being connected in series.

3. A device for determining the specific gravity of a moving fluid comprising a pair of series-connected rotameters each including a vertically-elongated metering tube and a metering float adapted for up-and-down movement within said tube, each float having a generally vertically-extending weight-giving body portion and a generally transversely-extending annular head portion, the thickness of said head portion being not greater than ten per cent of its maximum transverse dimension, said body portion having a transverse dimension appreciably less than the maximum transverse dimension of said head portion, the float of one of said rotameters having a specific gravity only slightly different from the specific gravity of the fluid, the float of the other of said rotameters having a specific gravity substantially different from the specific gravity of the fluid.

4. A device for determining the specific gravity of a moving fluid comprising a pair of series-connected rotameters, each including a vertical metering tube and a metering float adapted for up-and-down movement within said tube, each of said floats having a generally vertically-extending body portion and having a thin annular generally transversely-extending head portion, the float of one of said rotameters having a specific gravity substantially different from the specific gravity of the fluid, the position of said float within its tube being dependent upon the rate-of-flow of the fluid and being generally independent of other factors, the float of the other of said rotameters having a specific gravity only slightly different from the specific gravity of the fluid, the position of said last-mentioned float within its tube being dependent upon the rate-of-flow of the fluid and also being dependent upon the specific gravity of the fluid and being generally independent of other factors.

5. A device for determining the specific gravity of a moving fluid comprising a pair of series-connected rotameters, each including a calibrated downwardly-tapered metering tube and a metering float adapted for free up-and-down movement within said tube, each of said floats having a relatively thin annular generally transversely-extending head portion and a vertically-elongated weight-giving body portion of appreciably lesser transverse dimension than said head portion, the float of one of said rotameters having a substantial negative buoyancy with respect to the fluid, the position of said float within its tube being dependent upon the rate-of-flow of the fluid and being generally independent of other factors, the other of said floats having a slight negative buoyancy with respect to the fluid, the position of said last-mentioned float within its tube being dependent upon the rate-of-flow of the fluid and also being dependent upon the specific gravity of the fluid and being generally independent of other factors.

KERMIT FISCHER.